US009363361B2

(12) United States Patent
Kimchi et al.

(10) Patent No.: US 9,363,361 B2
(45) Date of Patent: Jun. 7, 2016

(54) CONDUCT AND CONTEXT RELATIONSHIPS IN MOBILE DEVICES

(75) Inventors: Gur Kimchi, Bellevue, WA (US); Marc Eliot Davis, San Francisco, CA (US); Matthew Graham Dyor, Bellevue, WA (US); Eric J. Horvitz, Kirkland, WA (US)

(73) Assignee: Microsoft Technology Licensing LLC, Redmond, WA (US)

( * ) Notice: Subject to any disclaimer, the term of this patent is extended or adjusted under 35 U.S.C. 154(b) by 786 days.

(21) Appl. No.: 13/084,975

(22) Filed: Apr. 12, 2011

(65) Prior Publication Data

US 2012/0262582 A1    Oct. 18, 2012

(51) Int. Cl.
*H04M 1/725*  (2006.01)
*G06F 3/01*  (2006.01)

(52) U.S. Cl.
CPC .......... *H04M 1/72569* (2013.01); *G06F 3/011* (2013.01); *H04M 2250/52* (2013.01)

(58) Field of Classification Search
CPC .......... G06F 3/011; G06F 9/00; H04M 1/00; H04M 1/72569; H04M 2250/52; G01C 21/26; G01C 21/16; G01C 22/006; G06T 19/006
USPC ............................................ 348/159, E7.085
See application file for complete search history.

(56) References Cited

U.S. PATENT DOCUMENTS

| 6,118,888 | A * | 9/2000 | Chino et al. .................. 382/118 |
| 6,191,686 | B1 | 2/2001 | Gabriel |
| 6,321,158 | B1 * | 11/2001 | DeLorme et al. ............. 701/426 |
| 2003/0054866 | A1 | 3/2003 | Byers et al. |
| 2005/0073438 | A1 | 4/2005 | Rodgers et al. |
| 2006/0221051 | A1 * | 10/2006 | Flynt et al. ..................... 345/156 |
| 2006/0284979 | A1 * | 12/2006 | Clarkson ....................... 348/143 |
| 2007/0060054 | A1 | 3/2007 | Romesburg |
| 2007/0081262 | A1 * | 4/2007 | Oizumi et al. ................ 359/843 |
| 2007/0210912 | A1 | 9/2007 | Lynt, III |
| 2009/0177391 | A1 * | 7/2009 | Yakali ........................... 701/210 |
| 2010/0222029 | A1 | 9/2010 | Kamat |
| 2010/0226535 | A1 * | 9/2010 | Kimchi et al. ................ 382/103 |
| 2012/0212508 | A1 * | 8/2012 | Kimball ....................... 345/633 |

OTHER PUBLICATIONS

"Accident Avoidance Technologies", Ford, retrieved on Oct. 29, 2010 from <<http://www.ford.com/microsites/sustainability-report-2009-10/issues-vehicle-safer-avoidance>>, 3 pages.
"Ford Enhances Crash Avoidance System With Wireless Technology", Nitrobahn, Retrieved on Oct. 29, 2010 from <<http://www.nitrobahn.com/news/ford-enhances-crash-avoidance-system-with-wireless-technology/>>, 9 pages.

* cited by examiner

*Primary Examiner* — Mohammed Rahaman
(74) *Attorney, Agent, or Firm* — Steve Wight; Sandy Swain; Micky Minhas

(57) ABSTRACT

Described herein is a technique for customizing device behavior based on evaluated relationships between a user and the user's environment. User conduct is analyzed based on available sensors, which may include user-facing cameras. The user's environmental context is similarly evaluated based on the available sensors. Conduct and context, as well as any identified relationships between such conduct and context, may be reported to application programs, and may form the basis for customized device behavior.

17 Claims, 5 Drawing Sheets

CONDUCT AND CONTEXT RELATIONSHIPS IN MOBILE DEVICES

BACKGROUND

Personal communications devices are becoming more and more essential to individual users, and are often carried and used on a nearly continuous basis. For example, a user may be checking email or texting while walking, or using navigational features of a device while driving.

Personal communications devices are also increasingly being equipped with different types of input and sensors. Many such devices have one or more cameras for photography and video recording. Devices also commonly have microphones and speakers for two-way communications, media playback, and other uses. Other types of sensors may include touch-sensitive screens, keyboards, buttons, surface sensors, thermometers, altimeters, gyroscopes, accelerometers, global positioning sensors, compasses, radio receivers, optical sensors, and so forth, as well as logic for utilizing the information reported by these various sensors.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

SUMMARY

Figure 1:
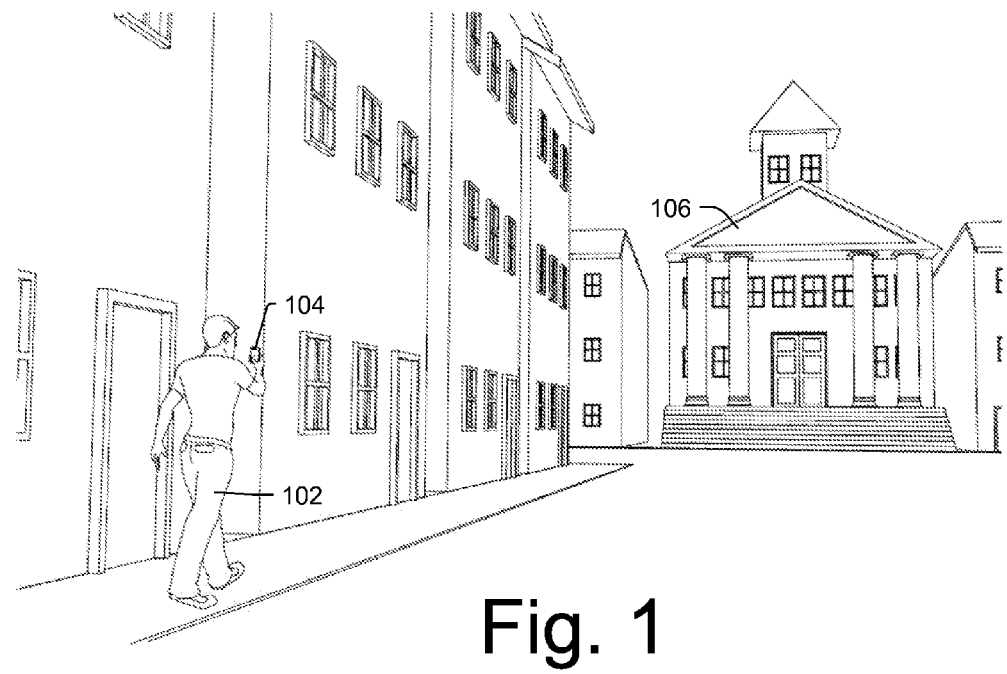
FIG. 1 is an illustration showing an example usage scenario for the devices and techniques described herein.

A mobile device may be configured to gather information from various sensors to determine a user's conduct and context, and to customize device or application behavior accordingly. For example, user conduct may be determined by analyzing images from a user-facing camera. Environmental context may be determined by analyzing images from an environment-facing camera. The determined conduct and context may be analyzed relative to each other to identify relationships between the user and the user's environment. Such relationships may be reported to applications on the mobile device, and the applications may customize their behavior and that of the device depending on the nature of the reported relationships.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

This application describes techniques for gathering information from various available sensors to determine a user's conduct and the user's environmental context, and for customizing device or application behavior based on relationships between these two factors. In one embodiment, cameras are used to observe user conduct and environmental context. For example, output from a user-facing camera may be analyzed to determine conduct of the user, such as the direction the user is facing or the direction in which the user is looking Output from an environment-facing camera may be analyzed to determine environmental context, such as the presence of objects, people, landmarks, and so forth. Based on the user's current conduct and environmental context, the device may infer user intent or needs, and may alter its behavior accordingly. For example, the device may infer that the user is gazing at a particular historical building, and may automatically locate and offer information about the building to the user. As another example, the device may infer that the user is walking while looking at the device screen, and that there is an obstacle in front of the user; in this situation, the device might warn the user of an impending collision.

Although one or more cameras may be used as means of observing user conduct and environmental context, many other sensors may also be used, either independently or in conjunction with each other. Environmental context, for example, may be derived or supplemented based on geographic coordinates of the device gleaned from a global positioning sensor. Orientation of the device, obtained by means of a compass or accelerometer, may also be used to determine environmental context. Both position and orientation may be used in conjunction with stored or online databases to obtain additional environmental information. Furthermore, an analysis of user conduct in conjunction with the device position and orientation may allow the device to determine the user's absolute orientation or the real-world focus of the user's attention, and to customize device behavior accordingly.

As another example, both user conduct and environmental information may be learned or inferred from a sensor such as a microphone. Ambient sounds may indicate things about the environment, and may even be used as the basis for inferring presence or nearness of certain things such as people, traffic, pets, etc. Similarly, user-generated sounds may allow the device to detect breathing rates and to infer activity levels based on the breathing rates.

Many other types of sensors may also be used to determine or infer both user conduct and environmental context.

The term "user conduct" is used herein to describe positions, orientations, actions, activities, and/or states of a user. This might include the direction of a user's gaze, either relative to the user's device or relative to the world. It might also include things such as user gestures, whether the user is talking, whether the user's eyes are open or blinking, what the user is wearing, what the user is doing, sounds the user is making, what the user is saying, the direction and rate of user movement, where the user is located, the geographic position and orientation of the user, how the user is performing, and so forth. The term "environmental context" is used herein to describe things, actions, and/or states that exist at or near the user, and that otherwise describe the user's environment. Context information may include position, orientation, speed, acceleration, height, and so forth. It may also include nearby objects, people, or things. Context may include the identity of certain things, such as the identify of people, objects, buildings, landmarks, etc. Environmental context may also include information about ambient conditions such as temperature, brightness, humidity, noise level, and so forth. Context may also include actions or activities that are happening in the vicinity of the user. The context may also indicate the positions, distances, and/or directions of these things relative to the user.

Figure 2:
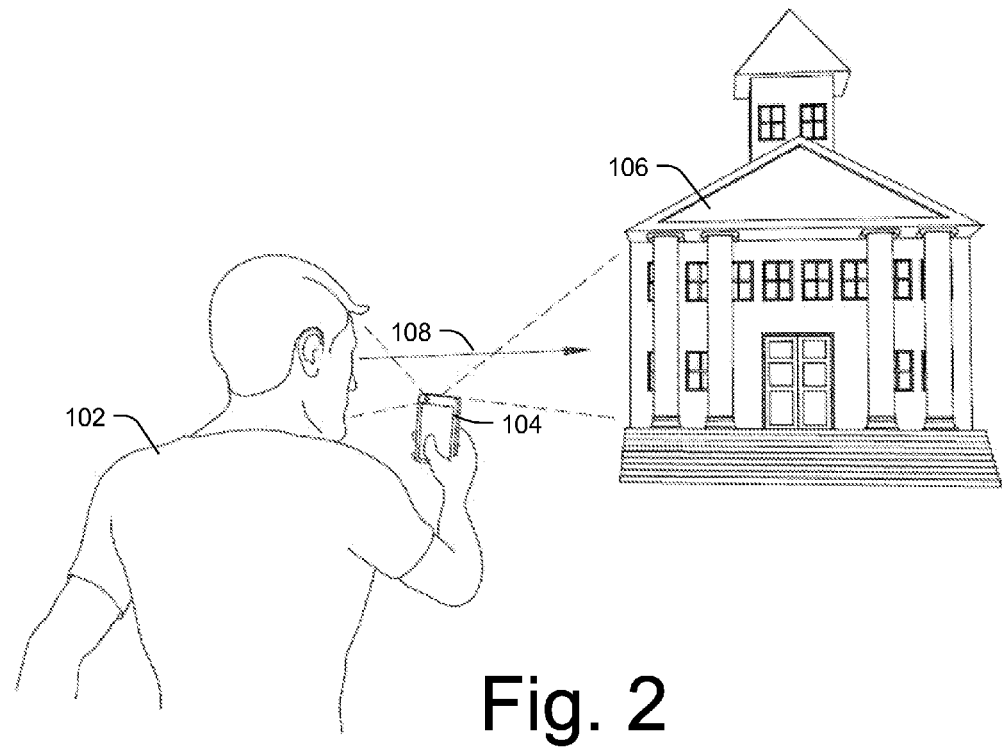
FIG. 2 is an enlarged portion of FIG. 1, showing additional concepts and relationships.

FIGS. 1 and 2 illustrate an example of these techniques in use. A user 102 has a personal device 104 such as a mobile phone, smartphone, personal digital assistant (PDA), media player, or other portable or mobile device having similar or other computer-like capabilities. The personal device 104 has one or more user sensors and one or more environment sensors. In this case, the sensors comprise cameras.

Figure 3:
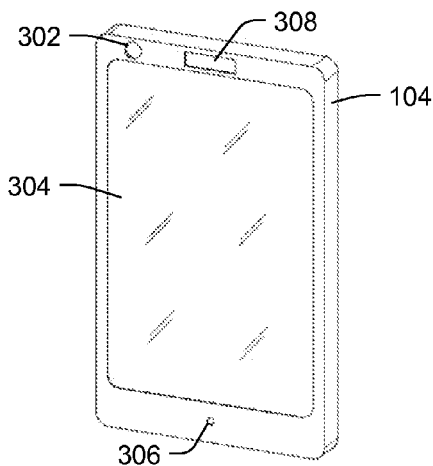
FIG. 3 is a front perspective view of a device such as might be used in conjunction with the techniques described herein.
Figure 4:
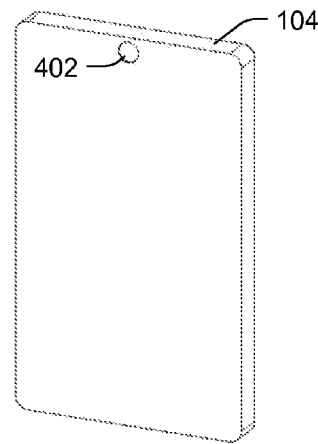
FIG. 4 is a rear perspective view of the device shown in FIG. 3.

FIGS. 3 and 4 show the personal device 104 in more detail. Referring first to FIG. 3, a user sensor, in this example comprising a user-facing camera 302, is located on the front of the device above a screen or display 304. The user-facing camera 302 may also be referred to as a front-facing camera. When the device 104 is held by the user in a convenient position for viewing the display 304, the head, face, or upper body of the user may be within the field of view of the user-facing camera 302. In some implementations, the camera 302 may have a fixed focal length. In others, it may have automatic panning and/or zooming capabilities to automatically follow the user's face as the user moves relative to the device 104.

An environment sensor, in this example comprising an environment-facing camera 402, is located on the back of the device as shown in FIG. 4. The environment-facing camera 402 may also be referred to as a rear-facing camera. In some implementations, the environment-facing camera 402 may have a wide field of view so that the camera can detect larger portions of the environment surrounding the user. In many situations, the camera will be positioned to capture images of the visual environment in front of the user. However, the camera 402 or additional cameras may also be positioned and oriented to face in other directions, and to capture images of the environment surrounding or to the sides of the user.

The device 104 may have other sensors, such as a microphone 306 and a speaker 308 as shown in FIG. 3. As indicated above, sensors may also include additional cameras, surface sensors, position/orientation sensors, and so forth. Depending on the particular implementation and usage scenario, any individual sensor may be considered a user sensor, an environment sensor, or both.

Referring again to FIGS. 1 and 2, the personal device 104 is illustrated in a position in which it might be held by the user 102. In this position, the user-facing camera 302 faces or focuses on the user 102, and its field of view (indicated in FIG. 2 by a set of dashed lines between the device 104 and the user 102) encompasses the user's face. The environment-facing camera 402 faces or focuses away from the user, toward the user environment. Of interest in the environment is a particular building 106 at which the user is gazing. A line 108 indicates the direction of the user's gaze. The field of view of the environment-facing camera 402 (indicated by a set of dashed lines between the device 104 and the building 106) encompasses the building 106 at which the user is gazing.

In a situation such as this, the personal device 104 may analyze an image of the user's face and eyes, obtained from the user-facing camera 302, to determine the direction of the user's gaze relative to the personal device 104. The personal device 104 may further analyze an image of the user's environment, obtained from the environment-facing camera 402, and calculate the direction of the user's gaze 108 relative to the environment. From this information, the personal device 104 may determine that the user is gazing at the building 106.

After determining what the user is gazing at, the personal device 104 may attempt to identify it. In some embodiments, the personal device 104 may include location and orientation sensors, allowing it to determine its absolute geographic location and orientation. It may then refer to a database, which may be local or online, to determine nearby things of interest and their directional relationship to the personal device 104. With this information, it may determine which of these things the user is looking at, and may obtain some type of information about the object of the user's gaze. This information may then be presented to the user, either by displaying it on the screen of the personal device 104 or by some other means such as audio.

The presented information may comprise descriptive information, contact information or other things that may interest the user. In some cases, the information may simply identify the object of the user's gaze, such as indicating that it is the "Continental Building." An enlarged picture of the object may also be displayed by the personal device, obtained either from archival sources or in real-time from the environment-facing camera.

Figure 5:
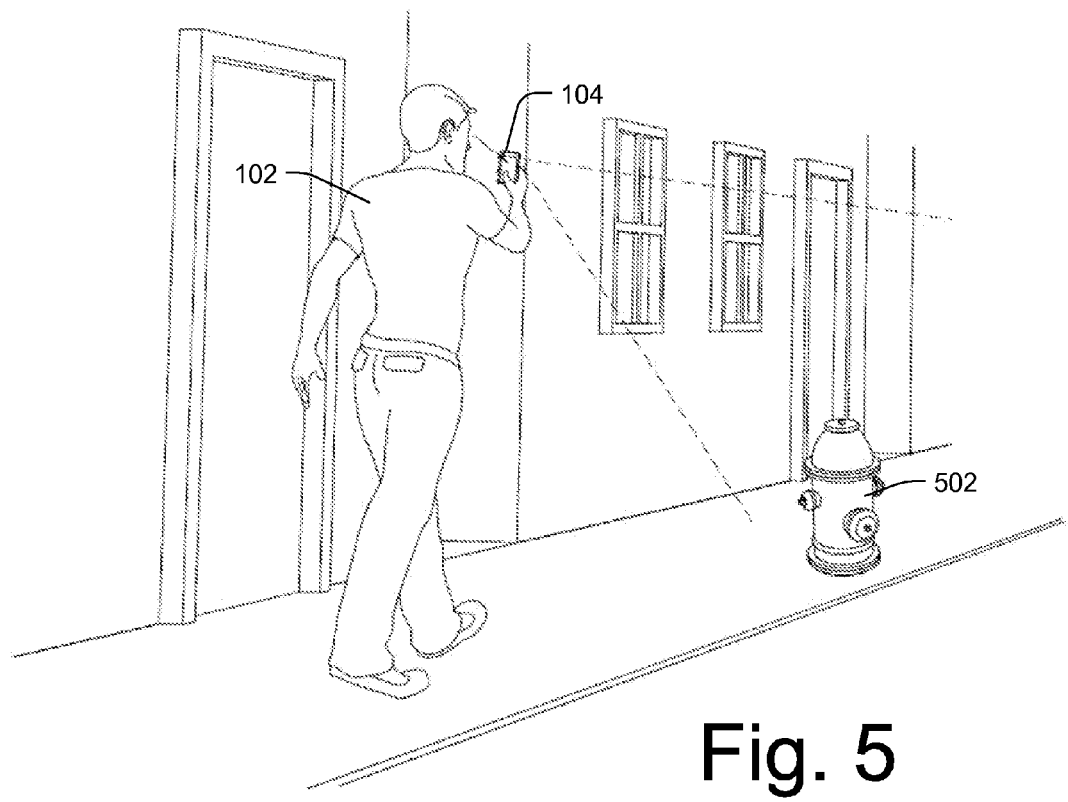
FIG. 5 is an illustration showing another example usage scenario for the devices and techniques described herein.

FIG. 5 illustrates another example of how a user's relationship to his or her environment may by analyzed to modify or customize device behavior. In this example, the user 102 is walking toward an obstacle or potential hazard, which in this case comprises a fire hydrant 502. The user in this example is gazing at the screen of the personal device 104. The field of view of the device's environment-facing camera encompasses the path of the user.

In this example, the personal device 104 may determine by analyzing images from the environment-facing camera there is obstacle (hydrant 502) generally in front of the user, and that the user is walking in a direction that is generally toward the obstacle. At the same time, the personal device 104 may analyze images from the user-facing camera and determine that the user is focusing their attention away from the obstacle, such as toward the screen of the personal device 104. The personal device 104 may determine from this that the user is approaching a collision with the hydrant 502, and may issue a warning to the user by some means such as an audible alert.

Figure 6:
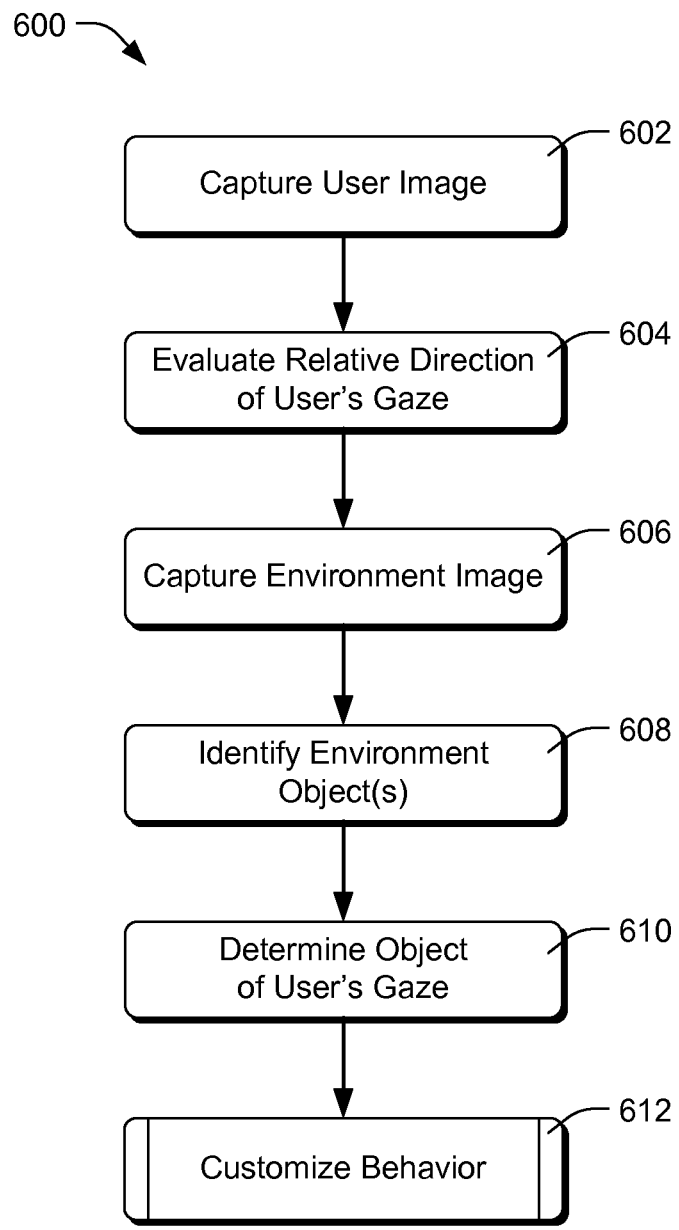
FIG. 6 is a flow diagram illustrating an example technique of customizing device behavior based on user and environment relationships.

FIG. 6 illustrates an example 600 of how this behavior might be implemented within a personal device 104. The actions shown in FIG. 6 may be performed iteratively and continuously by the device 104.

An action 602 comprises capturing one or more images of the user 102. As described above, such images may be captured by a front-facing or user-facing camera 302.

An action 604 comprises evaluating or analyzing the one or more images of the user to determine the direction of the user's gaze relative to the device 104.

An action 606 comprises capturing one or more images of the user's environment. Such images may be captured by a rear-facing or environment-facing camera 402, as described above.

An action 608 comprises identifying objects or other environmental context based on the one or more captured environmental images. This may be accomplished by determining the geographic location and orientation of the device 104, using global positioning information and other information such as might be obtained from a device compass, accelerometer, or other sensor. Based on location and orientation, local or online databases may be referenced to determine or identify objects appearing in the one or more captured environmental images.

An action 610 comprises determining the relationship of the user to the user's environment; more specifically, determining the object of the user's gaze. As described above, the direction of the user's gaze has already been determined relative to the device 104. In addition, the locations of environmental objects have been determined relative to the device 104. With this information, the direction of the user's gaze can be calculated relative to the objects within the environment, and the single object at which the user is gazing can be determined.

An action 612 comprises customizing device behavior based on the relationship determined at 610. If the user is gazing at a particular object, for example, the device may present additional information about the object. If the user is gazing at the device itself, the device may present warning information or other information about the user's surroundings. Although the description thus far has emphasized the use of optical and camera-based information for evaluating user conduct and environmental context, many other types of sensors can also be used to gather such information, as mentioned above.

Figure 7:
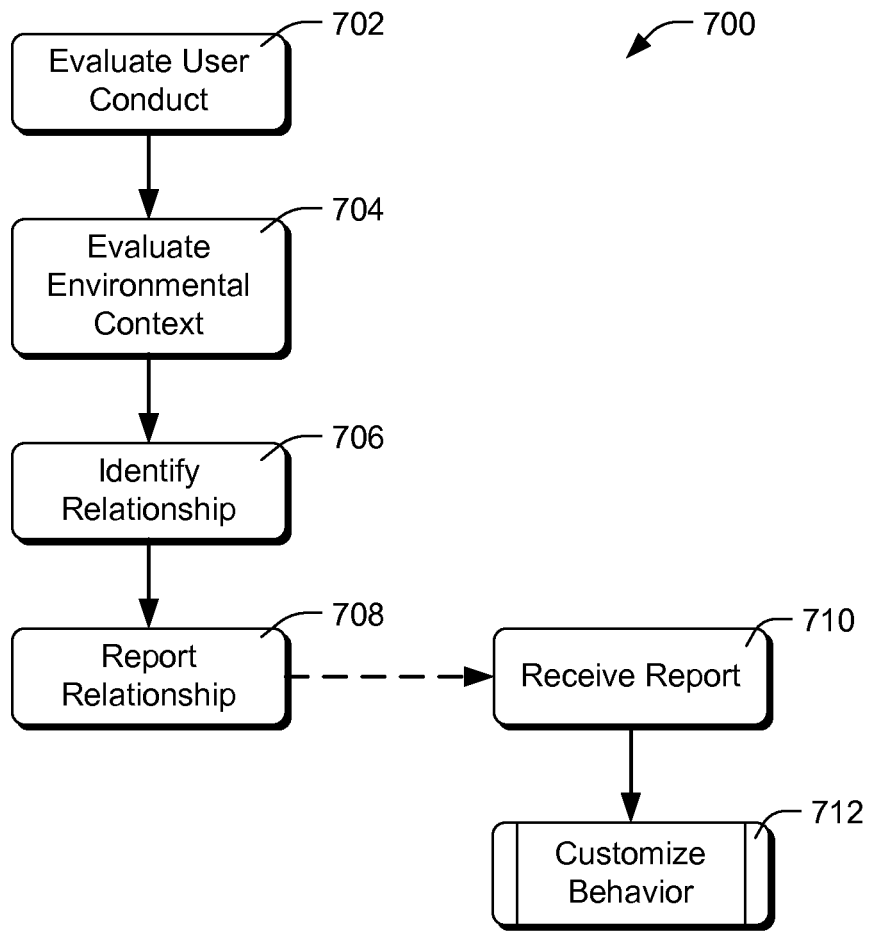
FIG. 7 is a flow diagram illustrating another example technique of customizing device behavior based on user and environmental relationships.

FIG. 7 illustrates the described techniques in a more general situation in which different types of sensors may be used to infer or evaluate user conduct and environmental context, as well as to determine or infer the relationships between conduct and context. In addition, FIG. 7 illustrates an example in which the device 104 has built-in logic for reporting conduct/context relationships to installed applications, and in which applications may take actions that are based upon such reported conduct/context relationships.

Along the left side of FIG. 7 are actions that might be performed by an operating system or built-in firmware of the device 104. Along the right side of FIG. 7 are actions that might be performed by applications installed on the device 104.

An action 702 comprises determining current user conduct such as, for example, the direction of the user's gaze relative to the device 104. This action may be performed by analyzing various sensor output, such as the output of the user-facing camera 302.

An action 704 comprises determining information about the user's environment or environmental context. In the examples described above, this information may include location of the user and the identity of objects around or near the user.

An action 706 comprises identifying relationships between the user conduct and the user's environment. For example, the device 104, in response to detecting that the user is gazing in a particular direction, might relate this to the environment in front of the user and determine that the user's gaze is actually directed to a particular environmental object.

At 708, the determined relationship—in this case between the user's gaze and the environmental object at which the gaze is directed—may be reported through an application interface to one or more applications that have been installed on the device 104.

At 710, an application receives a report of the determined relationship by means of the application interface implemented by the device firmware or operating system. At 712, the application may respond in a way that is customized to the reported relationship. For example, it may query a data source for supplemental information regarding the object of the user's gaze, and may present such information to the user. As another example, it may respond to reported dangerous conditions by warning the user.

Figure 8:
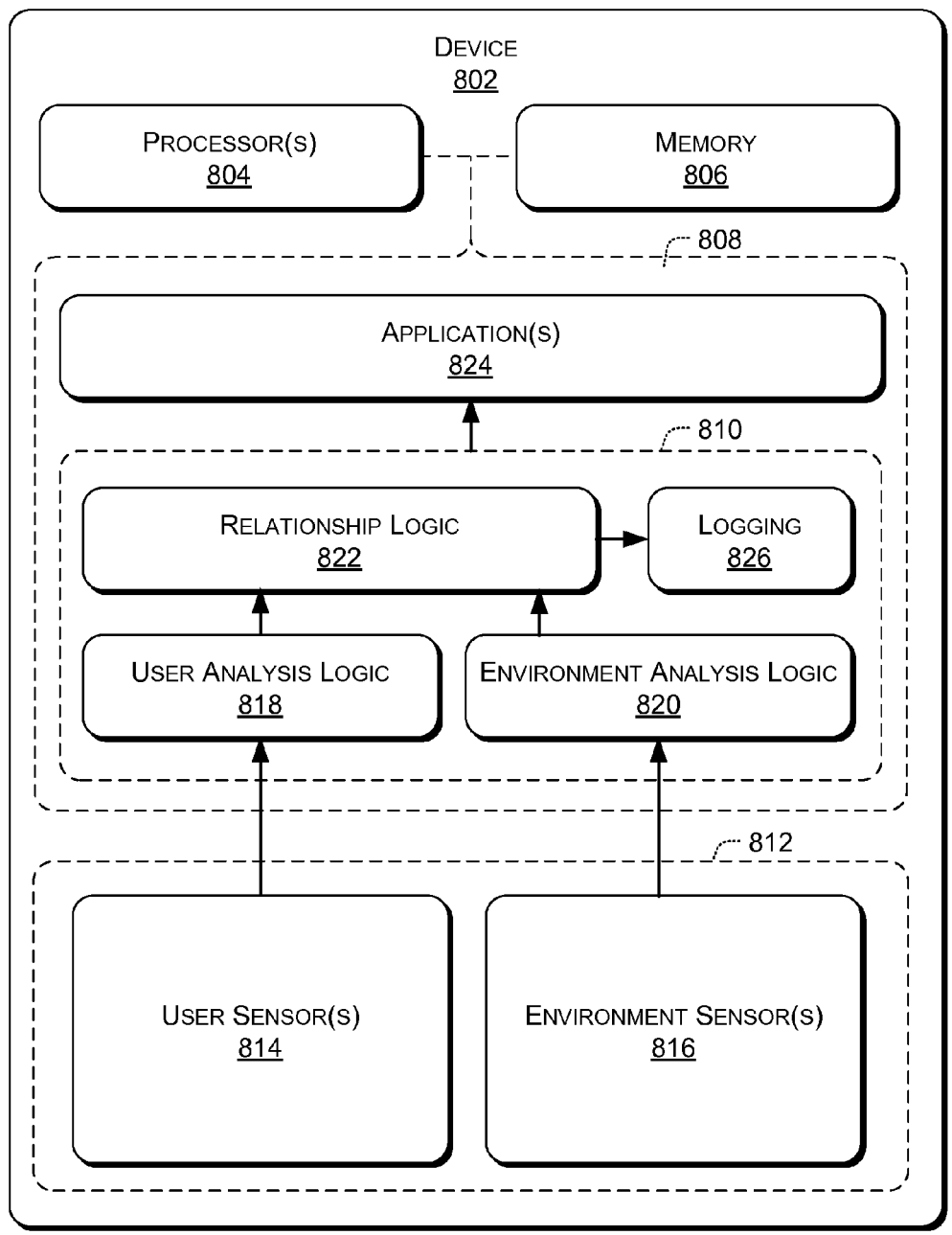
FIG. 8 is a block diagram of a device in which the described techniques may be implemented.

FIG. 8 shows relevant components of an example personal device 802 that may be used to implement the techniques described herein. Personal device 802 may comprise a mobile or portable device such as a computer, a phone, a camera, a recorder, a personal media viewer or player, or other device the combines or integrates multiple capabilities.

The mobile device may have operational logic that varies device operation based at least in part on the conduct and context of the user, and/or on the relationship of the user to their environment. In this example, the operational logic is implemented by one or more processors 804, associated computer-readable memory 806, and one or more programs 808 that are stored in memory 806 to be executed by processor(s) 804.

Memory 806 is an example of computer-readable media. Computer-readable media includes at least two types of computer-readable media, namely computer storage media and communications media.

Computer storage media includes volatile and non-volatile, removable and non-removable media implemented in any method or technology for storage of information such as computer readable instructions, data structures, program modules, or other data. Computer storage media includes, but is not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device.

In contrast, communication media may embody computer readable instructions, data structures, program modules, or other data in a modulated data signal, such as a carrier wave, or other transmission mechanism. As defined herein, computer storage media does not include communication media.

The programs 808 may include built-in components, such as an operating system and other programs, routines, or logic to support the functionality of the device 802. Such built-in software or firmware components may comprise support logic 810 that works in conjunction with one or more I/O devices 812 to perform the functionality described herein.

The I/O devices 812 may include one or more user sensors 814 and one or more environment sensors 816. Each of the sensors 814 and 816 may comprise one or more cameras or other types of sensors. Cameras may comprise still-motion cameras and/or video cameras. Other potential types of sensors include microphones, touch-sensitive screens or other touch-sensitive surfaces, keyboards, buttons, mechanical mechanisms, force sensors, surface sensors, temperature sensors, pressure sensors, altimeters, gyroscopes, accelerometers, global positioning devices, compasses, radio receivers or detectors (WiFi, Bluetooth, cellular, etc.), optical sensors, proximity sensors, light or color sensors, and so forth.

Support logic 810 has functionality for receiving information from the sensors 814 and 816, and for identifying or inferring information and relationships based on the information received from sensors. For purposes of illustration, functionality of the support logic 810 is illustrated as discrete blocks corresponding to functional program modules. However, the functionality provided by support logic 810 may be implemented in various different ways, with different divisions and allocations of responsibilities. In one implementation, the support logic 810 includes user analysis logic 818 and environment analysis logic 820. Generally, the user analysis logic 818 is responsive to the user sensor(s) 814 to identify conduct of the user. The environment analysis logic 816 is responsive to the environment sensor(s) 816 to identify the context of the user.

In embodiments in which the user sensor(s) 814 comprises an optical camera or image sensor, the user analysis logic 818 can be configured to process and analyze sequential images of the user to determine user conduct. For example, the user analysis logic 818 may calculate, using image analysis techniques, the position, orientation, and gaze of the user relative to the device 802. The user analysis logic 818 may also be configured to calculate facial expressions and other user visual user characteristics, and may be additionally configured to determine the orientation of user's head relative to device 802.

In embodiments using other types of sensors, the user analysis logic may use additionally sensed properties to infer other things about a user. For instance, a microphone may be monitored to detect when the user is speaking The user's speech tone may be analyzed to determine mood or other user states. In some cases, a microphone may be used to determine the user's rate of respiration, or how deeply the user is breathing.

In various embodiments, it may be possible based on available sensors to infer different user states, such as whether the user is sleeping or has fallen asleep, how actively the user is observing or engaging their environment, and so forth.

The environment sensor(s) 816 may also comprise one or more cameras, and the environment analysis logic 820 may process and analyze sequential images of the environment to determine or infer the environmental context of the user. For example, the environment analysis logic 820 may identify nearby objects or landmarks, with reference to local or remote databases. Image analysis may also reveal things such as the type of surface the user is traversing, whether the user is moving, how fast the user is moving, whether it is raining or snowing, whether the sun is shining, whether the user is indoors or outdoors, etc.

Other types of environment sensors 816 may allow the environment analysis logic 820 to determine or infer even more information, such as exact geographic location and orientation, altitude, speed, temperature, etc.

In certain embodiments, the user analysis logic 818 can be configured to report the inferred conduct of the user, such as what the user is doing, where the user is looking, and so forth as described above. Similarly, the environment analysis logic 820 can be configured to report the inferred environmental context of the user, such as location, surrounding objects, and so forth as described above. The user analysis logic 818 and the environment analysis logic 820 may expose programmatic application interfaces allowing other software components to receive this information.

The support logic 810 may also include relationship logic 822 that identifies or infers the relationship of the user to the user's environment, based on the conduct of the user as reported by the user analysis logic 818 and the environmental context of the user as reported by the environment analysis logic 820. More specifically, the relationship logic 822 communicates with or receives communications from the user analysis logic 818 regarding conduct of the user, such as what the user is doing, where the user is facing, where the user is looking, and so forth, as already mentioned above. Similarly, the relationship logic 822 communicates with or receives communications from the environment analysis logic 820 regarding the environmental context of the user, such as geographic location and orientation, the existence and identity of nearby things and people, and other environmental conditions, as also described above. Based on the information reported by the user analysis logic 818 and the environment analysis logic 820, the relationship logic 822 identifies or infers one or more relationships between the user and the user's environment.

Relationships between the user and the user's environment may include physical relationships, such as the position and orientation of the user relative to nearby and remote things or people. Relationships may also indicate activities. For example, the relationship logic may infer that the user is currently driving a car in a certain location, and headed toward a particular landmark, or that the user is holding a particular object in a particular way.

Based on user information and environment information, the relationship logic 822 may also calculate the position and orientation of the user relative to the environment. For example, the environmental analysis logic 820 may determine that the device 802 is at a particular geographic location, oriented in a particular direction, and facing or moving toward one or more objects. The user analysis logic 818, similarly, may determine that the user is gazing in a particular direction relative to the device 802. With this information, the relationship logic 822 may determine whether or not the user is looking toward any one of the environment objects.

As another example, the environment analysis logic 820 may identify various friends of the user and their locations relative to the user. This identification may be performed by image analysis, or might be performed in other ways such as by receiving positional data from devices carried by the friends. The user analysis logic 818 may in turn determine the direction in which the user's head is facing relative to the device 802. By combining this information, the relationship logic 822 can determine the directions of the user's friends relative to the user's head.

The relationships identified by the relationship logic 822 may in certain embodiments be made available to other software components of the device 802 by way of programmatic application interfaces.

The programs 808 may include operational logic or applications 824 that are responsive to relationships identified by the relationship logic 822, and that vary device operation based at least in part on the identified relationships between the conduct and context of the user. The applications 824 may include built-in or pre-installed applications, as well as applications installed by users. The applications 824 may also include or utilize components of the device operating system, and in particular may utilize information available from the user analysis logic 818, the environment analysis logic 820, and the relationship logic 822.

More specifically, the applications 824 may receive conduct, context, and relationship information from the support logic 810, and vary or customize their behavior based on the received information. For example, information and/or alerts may be provided to a user based on relationships identified by the relationship logic 822. Thus, if a user is about to collide with an object, an application may cause the device 802 to alert the user. Similarly, if the user is looking at a particular environmental object, the device may display information about the object.

As another example, an application 824 may configure the device 802 to automatically offer functionality that is tailored to current user conduct and context. Thus, if the user is gazing toward the device 802 while holding it before an object that is identified as a white board, the device 802 may present specialized functionality for capturing an image of the whiteboard. If the device 802 is being held in a position in which it is likely that the user wants to take a picture, and the user is gazing at the screen of the device 802, the device 802 may present functionality for taking camera snapshots.

Additional use cases may include:

Turning off the display of a mobile device for a driving user when a light turns green or the user's car begins to move, based on video stream analysis, a signal from a nearby traffic light, an accelerometer or GPS reading, etc.

Alerting the user when attention is needed, such as when a light turns green or a vehicle is approaching.

Notifying a user of items of interest that the user should see.

Pausing an audio book or other audio media when a noise makes the audio stream difficult to hear, such as when a bus passes near.

Increasing audio volume in response to increased ambient noise.

Decreasing volume of an audio stream in response to detecting an announcement or alert relevant to the user.

Manipulating audio generated by other users depending on their locations relative to the orientation of the user's head. Remotely communicating users who are physically to the right of the user may sound as if they are located on the right. As the user turns their head, the sound will continue to be directed from the same absolute direction.

Alerting the user when the user's attention lags or the user's gaze wanders during a dangerous activity.

Initiating particular applications or activities in response to certain situations, such as opening a phone application when the user places the mobile device next to their ear.

Interpreting spoken commands in accordance with current user conduct and context, such as interpreting names as dialing requests when a user is holding the phone next to their ear.

Performing special actions when a user looks at a particular portion of the screen, such as presenting supplemental information about something that the user is looking at on the screen.

Pushing notifications and/or alerts to social websites and other network locations in response to certain user activities.

Providing audio information, communications, or instructions to a user, with the apparent source of the audio being spatially controlled by the mobile device so that the audio is perceived to originate from the direction of the physical subject to which it pertains.

Providing audio information that varies in volume based on the nearness of the subject to which it pertains.

Notifying the user when friends or acquaintances are nearby.

Notifying others regarding the user's activities.

Directing actions toward objects at which a user is looking, such as directing an email to a person at which the user is gazing.

Many other types of functionality could of course be implemented based in the information available from the user analysis logic 818, the environment analysis logic 820, and the relationship logic 822.

In addition to the components described above, the support logic 810 may include a logger or logging module 826. Over time, relationships identified by the relationship logic 822 may be recorded or logged by the logging module 826 and made available to the applications 824. The applications 824 may retrieve this historical information and use it for various purposes. In some embodiments, relationships might be logged over a limited, rolling time period, so that relationships from the last few minutes are always known to the logging module 826 and available to the applications 824. Logged information such as this might be used for safety, regulatory, and forensic purposes.

Note that in addition to relationships identified by the relationship logic 822, the logging module 826 may also, or alternatively, log user conduct and context information from the user analysis logic 818 and the environment analysis logic 820.

CONCLUSION

Illustrative systems and methods of managing dissemination of location information are described above. The illustrative methods are illustrated as a collection of blocks in a logical flow graph representing a sequence of operations that can be implemented in hardware, software, firmware, or a combination thereof. Certain features of the systems and acts of the methods need not be arranged in the order described, may be modified, and/or may be omitted entirely, depending on the circumstances. Also, any of the acts described above with respect to any method may be implemented by a processor or other computing device based on instructions stored on one or more computer-readable storage media.

Furthermore, although the disclosure uses language specific to structural features and/or methodological acts, the invention is not limited to the specific features or acts described. Rather, the specific features and acts are disclosed as illustrative forms of implementing the invention.

The invention claimed is:

1. A mobile device comprising:
a user sensor to sense conduct of a user;
an environment sensor to capture images of an environment;
user analysis logic that is responsive to the user sensor to identify the conduct of the user;
environment analysis logic that is responsive to the environment sensor to identify a context of the user based in part on the images of an environment captured by the environment sensor; and
device operational logic that varies device operation based at least in part on the identified conduct and context of the user, wherein the device operation includes:
determining a first object based at least in part on the identified conduct of the user;
determining a second object located in a path being traveled by the user based at least in part on the context of the user and the identified conduct of the user; and
presenting an alert to the user based at least in part on determining that the first object is different than the second object.

2. The mobile device of claim 1, wherein the device operational logic further varies the device operation based on a relationship of the user to the environment as indicated by the identified conduct and the context of the user.

3. The mobile device of claim 1, wherein the environment sensor indicates a position of the mobile device.

4. The mobile device of claim 1, wherein the environment sensor indicates an orientation of the mobile device.

5. The mobile device of claim 1, wherein the conduct of the user is identified relative to the mobile device.

6. The mobile device of claim 1, wherein the identified conduct of the user comprises a position of the user relative to the mobile device.

7. The mobile device of claim 1, wherein the identified conduct of the user comprises an orientation of the user relative to the mobile device.

8. The mobile device of claim 1, further comprising an application interface that is accessible by applications executing on the mobile device to report the identified conduct and context of the user to the applications.

9. The mobile device of claim 1, wherein the user sensor comprises a user-facing camera.

10. The mobile device of claim 1, wherein the identified conduct of the user comprises at least one of:
   positions;
   orientations;
   actions;
   activities; or
   states.

11. The mobile device of claim 1, wherein the determining the first object further includes determining the first object of a gaze of the user based at least in part on the conduct of the user.

12. A mobile device comprising:
   a user-facing camera;
   an environment-facing camera;
   logic that is responsive to an analysis of an output of the user-facing camera and an analysis of an output of the environment-facing camera to identify relationships between a user and an environment associated with the user, wherein the analysis of the output of the environment-facing camera comprises:
      determining a first object based at least in part on a conduct of the user captured by the user-facing camera;
      determining a second object located in a path being traveled by the user based at least in part on a context of the user captured by the environment-facing camera; and
      presenting an alert to the user based at least in part on determining that the first object is different than the second object; and
   an application interface that is accessible by one or more applications executing on the mobile device to report the identified relationships to the applications.

13. The mobile device of claim 12, further comprising a logger that logs the identified relationships over time.

14. The mobile device of claim 12, wherein the logic analyzes images of the user to determine a conduct of the user.

15. The mobile device of claim 12, wherein the logic analyzes images of the user to determine a direction of the gaze of the user.

16. The mobile device of claim 12, wherein the logic analyzes images of the user to determine an orientation of the user relative to the mobile device.

17. The mobile device of claim 12, wherein at least one of the first object or second object includes at least one of a person, building, or landmark in the environment.

* * * * *